United States Patent
Mangin et al.

(10) Patent No.: US 6,671,279 B1
(45) Date of Patent: Dec. 30, 2003

(54) ESTABLISHING SHORTCUTS IN A MULTIPROTOCOL-OVER-ATM SYSTEM

(75) Inventors: Jim Mangin, San Ramon, CA (US); Mohan Kalkunte, Sunnyvale, CA (US); Derek Pitcher, Los Altos, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/257,075

(22) Filed: Feb. 24, 1999

(51) Int. Cl.[7] .............................................. H04L 12/28
(52) U.S. Cl. ..................................... 370/395.5; 370/401
(58) Field of Search ................................ 370/252, 253, 370/231, 232, 233, 234, 235, 235.1, 395.5, 395.51, 395.53, 395.54, 395.6, 397, 399, 409, 400, 401, 466

(56) References Cited

U.S. PATENT DOCUMENTS

| | | | | |
|---|---|---|---|---|
| 5,774,662 A | * | 6/1998 | Sakagawa | 395/200.33 |
| 5,878,043 A | * | 3/1999 | Casey | 370/397 |
| 6,064,675 A | * | 5/2000 | Alexander, Jr. et al. | 370/401 |
| 6,081,836 A | * | 6/2000 | Karapetkov et al. | 709/218 |
| 6,125,123 A | * | 9/2000 | Furuno | 370/467 |
| 6,421,321 B1 | * | 7/2002 | Sakagawa et al. | 370/238.1 |

* cited by examiner

Primary Examiner—Chau Nguyen
Assistant Examiner—Duc Duong
(74) Attorney, Agent, or Firm—Neil G. J. Mothew

(57) ABSTRACT

A technique for establishing a shortcut Virtual Channel Connection (VCC) in a Multi-Protocol Over ATM (MPOA) system detects a packet flow, and then determines whether to establish the shortcut VCC based upon an expected MPOA server response time. Specifically, an expected MPOA server response time is determined based upon an MPOA server response time history. The expected MPOA server response time is then compared to a predetermined MPOA server response time threshold to determine whether the expected MPOA server response time is within the predetermined MPOA server response time threshold. The shortcut VCC is established if the expected MPOA server response time is within the predetermined MPOA server response time threshold. Upon establishing the shortcut VCC, the MPOA server response time history is updated to reflect an actual MPOA server response time incurred when establishing the shortcut VCC.

24 Claims, 9 Drawing Sheets

ESTABLISHING SHORTCUTS IN A MULTIPROTOCOL-OVER-ATM SYSTEM

CROSS-REFERENCE TO RELATED APPLICATION

The present invention may be related to the commonly owned U.S. patent application Ser. No. 09/058,693 entitled OPTIMIZING FLOW DETECTION AND REDUCING CONTROL PLAN PROCESSING IN A MULTI-PROTOCOL OVER ATM (MPOA) SYSTEM, filed on Apr. 10, 1998 in the names of Brian Brown, Jeanne Haney, James Mangin, Derek H. Pitcher, and Kishore Seshadri, issued as U.S. Pat. No. 6,279,035 on Aug. 21, 2001, hereby incorporated by reference in its entirety, and referred to hereinafter as "Reference 1."

FIELD OF THE INVENTION

The present invention relates generally to communication networks, and, more particularly, to selectively establishing shortcuts in a Multiprotocol-over-ATM (MPOA) system based upon an MPOA server response time.

BACKGROUND OF THE INVENTION

In today's information age, communication devices typically support a number of different protocols that enable the communication devices to communicate over a data communication network. These various protocols are typically organized in layers, such that the protocol at a particular layer of the protocol stack provides communication services to the higher layer protocols and receives communication services from the lower layer protocols.

In order for the data communication network to be efficient, the data communication network is often divided into subnetworks. Communication devices within the same subnetwork communicate over a Local Area Network (LAN) using a LAN protocol, such as Ethernet or Token Ring, at a medium access control (MAC) protocol layer of the protocol stack. Communication devices on different subnetworks communicate using an internetwork protocol, such as the Internet Protocol (IP), IPX, or Appletalk; that requires routing at the internetwork protocol layer of the protocol stack. For convenience, a communication device that provides routing functions at the internetwork protocol layer of the protocol stack is commonly referred to as a "router."

With the advent of Asynchronous Transfer Mode (ATM) networks, it was desirable to allow communication devices to be internetworked over the ATM network, and specifically over Virtual Channel Connections (VCCs) in the ATM network, in much the same was as those communication devices were internetworked over the LAN. Therefore, a LAN Emulation procedure was defined to allow such communication devices to be internetworked over the ATM network. LAN Emulation enabled those communication devices within the same subnetwork to communicate as if those communication devices were internetworked over the LAN. However, communication between communication devices on different subnetworks still required routing at the internetwork protocol layer of the protocol stack.

Therefore, certain protocols were defined to allow communication devices on different subnetworks to communicate without requiring routing at the internetwork protocol layer of the protocol stack (or at least without requiring routing along the entire data path). One such protocol, known as Multiprotocol-over-ATM (MPOA), is described in an ATM Forum Technical Committee document entitled *Multi*Protocol Over ATM Version 1.0, document number AF-MPOA-0087.000 (July 1997), incorporated herein by reference in its entirety (referred to hereinafter as the "MPOA specification"). MPOA allows communication devices to communicate in an ELAN environment without requiring routing through the ELAN at the internetwork protocol layer of the protocol stack. Specifically, MPOA allows those communication devices at the edge of the ELAN to establish a shortcut VCC through the ATM network and forward the inter-subnetwork data traffic over the shortcut VCC rather than route the inter-subnetwork data traffic at the internetwork protocol layer of the protocol stack.

The present invention relates to the establishment of shortcut VCCs in an MPOA network.

SUMMARY OF THE INVENTION

In accordance with one aspect of the invention, a technique for establishing a shortcut Virtual Channel Connection (VCC) in a Multi-Protocol Over ATM (MPOA) system involves receiving packets, detecting a packet flow, determining that an expected MPOA server response time is within a predetermined MPOA server response time threshold, and establishing the shortcut. In various embodiments of the present invention, the packet flow is detected using a packet flow rate filter and/or a verification table filter.

In accordance with another aspect of the invention, a technique for establishing a shortcut VCC in an MPOA system involves receiving packets, detecting a packet flow, determining an expected MPOA server response time based upon MPOA server response time information stored in an MPOA server response time history, comparing the expected MPOA server response time to a predetermined MPOA server response time threshold to determine whether the expected MPOA server response time is within the predetermined MPOA server response time threshold, determining that the expected MPOA server response time is within the predetermined MPOA server response time threshold, and establishing the shortcut VCC. Upon establishing the shortcut VCC, the MPOA server response time information stored in the MPOA server response time history is updated to reflect an actual MPOA server response time incurred when establishing the shortcut VCC.

In accordance with yet another aspect of the invention, a technique for establishing a shortcut VCC in an MPOA system involves receiving packets, detecting a packet flow, determining an expected MPOA server response time based upon MPOA server response time information stored in an MPOA server response time history, determining an MPOA server response time threshold using a resource filter, comparing the expected MPOA server response time to the predetermined MPOA server response time threshold to determine whether the expected MPOA server response time is within the predetermined MPOA server response time threshold, determining that the expected MPOA server response time is within the predetermined MPOA server response time threshold, and establishing the shortcut VCC. Upon establishing the shortcut VCC, the MPOA server response time information stored in the MPOA server response time history is updated to reflect an actual MPOA server response time incurred when establishing the shortcut VCC.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
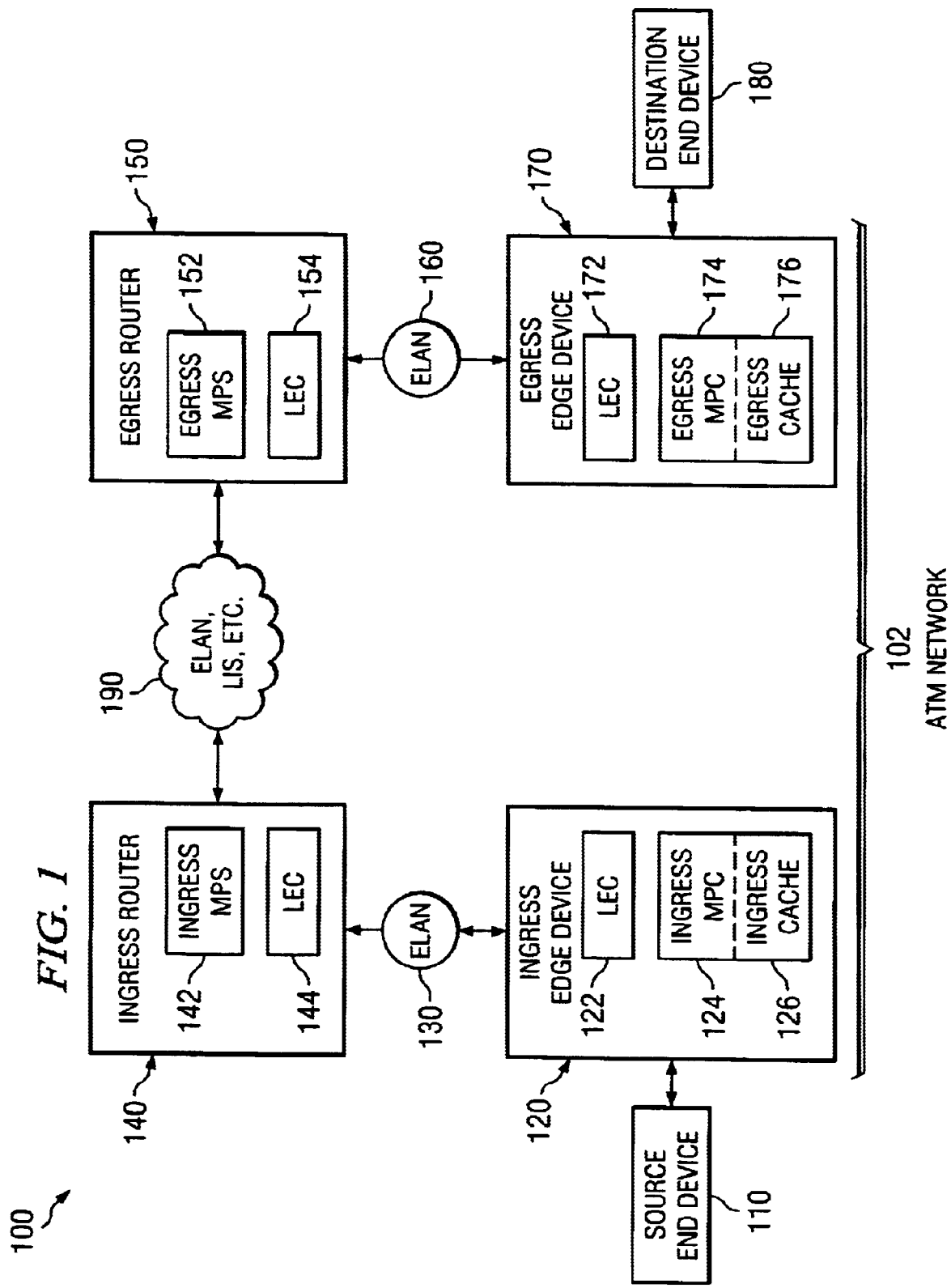
FIG. 1 is a block diagram showing an exemplary MPOA system for enabling a Source End Device in one subnetwork to transmit packets of information to a Destination End Device in a different subnetwork over an ATM network.

FIG. 1 shows an exemplary MPOA system 100 for enabling a Source End Device 110 in one subnetwork to transmit packets of information to a Destination End Device 180 in a different subnetwork over an ATM network 102. The Source End Device 110 interfaces to the ATM Network 102 via an Ingress Edge Device 120, and specifically via a LAN port of the Ingress Edge Device 120. The Destination End Device 180 interfaces to the ATM Network 102 via an Egress Edge Device 170, and specifically via a LAN port of the Egress Edge Device 170. The Ingress Edge Device 120 and the Egress Edge Device 170 are internetworked through a number of ATM switches and routers, including, in this example, the Ingress Router 140 and the Egress Router 150. In this example, the Ingress Edge Device 120 is coupled to the Ingress Router 140 over a first Emulated LAN (ELAN) 130, and the Egress Edge Device 170 is coupled to the Egress Router 140 over an second ELAN 160. The Ingress Router 140 and the Egress Router 150 communicate over a communication system 190, which can be an ELAN, a Logical IP Subnetwork (LIS), or other communication system.

In order to support LAN emulation functions, each LAN emulation network device includes a LAN Emulation Client (LEC) for each ELAN it supports. LECs perform LAN emulation functions in accordance with the ATM Forum's LAN Emulation over ATM specification. Thus, the Ingress Edge Device includes a LEC 122 for interfacing with the ELAN 130, the Ingress Router 140 includes a LEC 144 for interfacing with ELAN 130, the Egress Router 150 includes a LEC 154 for interfacing with the ELAN 160, and the Egress Edge Device 170 includes a LEC 172 for interfacing with the ELAN 160.

In order to support MPOA functions, each MPOA network device includes MPOA protocol logic. The MPOA protocol is a client-server application. The MPOA protocol logic that implements the client functions of the MPOA protocol is referred to as an MPOA Client (MPC), and the MPOA protocol logic that implements the server functions of the MPOA protocol is referred to as an MPOA Server (MPS). The edge devices typically implement the MPOA client functions, and therefore the Ingress Edge Device 120 and the Egress Edge Device 170 include MPCs 124 and 174, respectively. For convenience, the MPC 124 is often referred to as an "ingress" MPC, and the MPC 174 is often referred to as an "egress" MPC. The routers typically implement the MPOA server functions, and therefore the Ingress Router 140 and the Egress Router 140 include MPSs 142 and 152, respectively. For convenience, the MPS 142 is often referred to as an "ingress" MPS, and the MPS 152 is often referred to as an "egress" MPS. Of course, an MPC, such as the MPC 124, communicates with an MPS, such as the MPS 142, using the MPOA protocol. However, two MPSs, such as the MPS 142 and the MPS 152, communicate using the Next Hop Resolution Protocol (NHRP) in order to complete MPOA transactions between two MPCs, such as the MPC 124 and the MPC 174.

It should be noted that an MPC and an MPS can be, and often are, co-located within the same device. With reference to FIG. 1, it would be possible to combine the ingress functions of the Ingress Edge Device 120 and the Ingress Router 140 into a single ingress device that includes both the Ingress MPC 124 and the Ingress MPS 142. Likewise, it would be possible to combine the egress functions of the Egress Router 150 and the Egress Edge Device 170 into a single egress device that includes both the Egress MPS 152 and the Egress MPC 174.

In its role as ingress MPC, the MPC 124 provides a packet forwarding function within the MPOA system 100. Specifically, each packet received by the MPC 124 typically includes a source indicator, a destination indicator, and a protocol indicator. The MPC 124 selects an appropriate path based upon, among other things, the destination indicator in the received packet and forwards the packet to its destination over the selected path.

In accordance with the MPOA specification, there is always a default path from the MPC 124 to the MPC 174 over the LAN emulation connection between Ingress Edge Device 120 and the Egress Edge Device 170, and specifically between the LEC 122 and the LEC 172. Thus, the MPC 124 may forward the packet to the MPC 174 over the LAN emulation connection. Unfortunately, this default path is inefficient because packets must be routed from the Ingress Edge Device 120 to the Egress Edge Device 170, and specifically through a number of ATM switches and routers, including, in this example, the Ingress Router 140 and the Egress Router 150.

Figure 2:
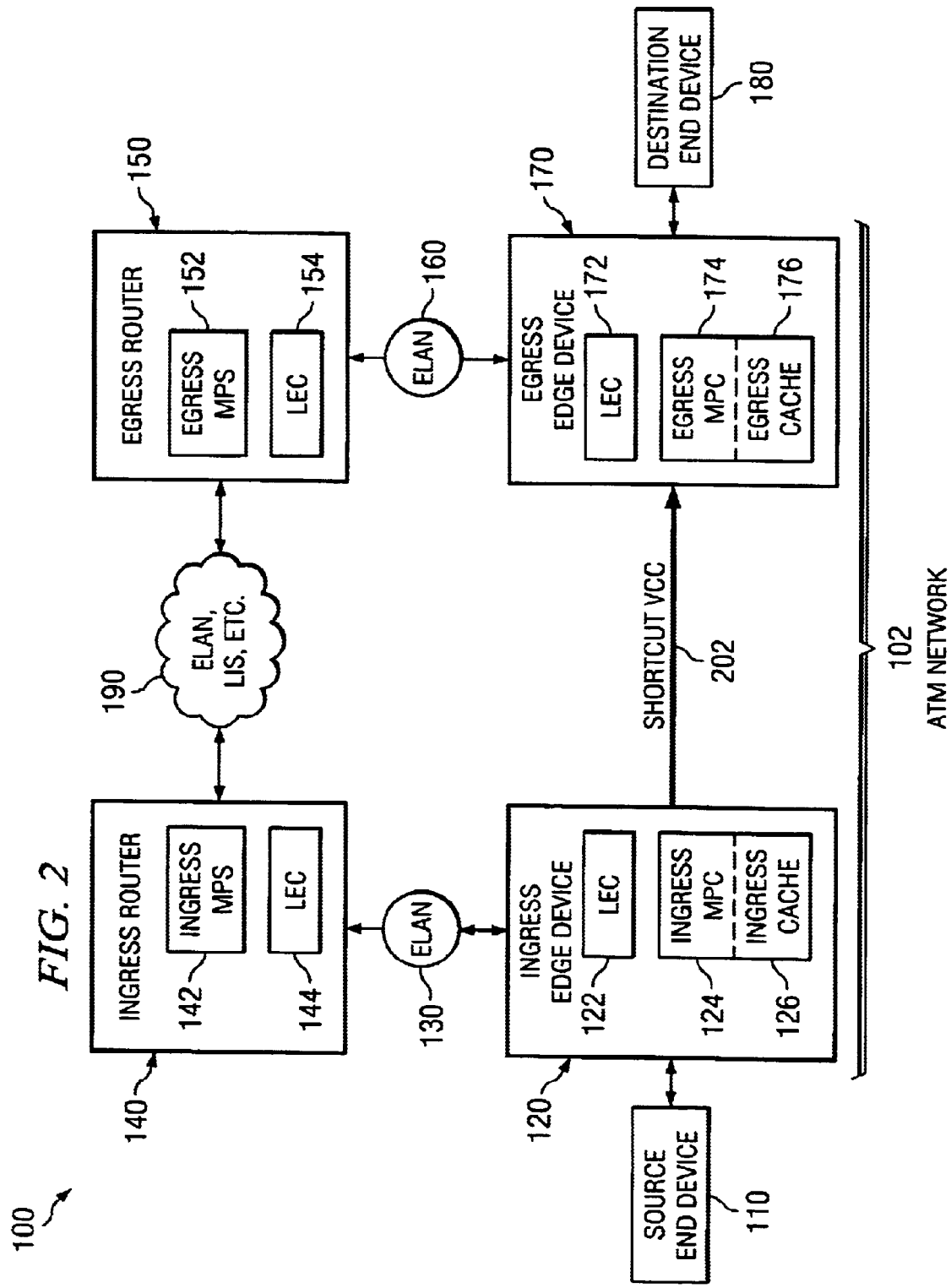
FIG. 2 is a block diagram showing an exemplary MPOA system for enabling a Source End Device in one subnetwork to transmit packets of information to a Destination End Device in a different subnetwork over a shortcut VCC in an ATM network.

Therefore, rather than forwarding packets over the default path, it is preferable for the MPC 124 to establish a shortcut VCC 202 between the MPC 124 and the MPC 174 over the ATM Network 102, as shown in FIG. 2, and to forward packets over the shortcut VCC 202. The shortcut VCC 202 may be either a physical connection or a logical connection through a number of high-speed ATM switches. The MPC 124 establishes the shortcut VCC 202 based upon some predetermined criteria indicating that the shortcut VCC 202 is desirable (described in detail below). The MPC 124 forwards a packet to the MPC 174 over the shortcut VCC 202 by adding a Logical Link Control (LLC) header onto the packet before sending the packet over the shortcut VCC 202. The shortcut VCC 202 is more efficient than the default path because the shortcut VCC 202 provides a direct path between the MPC 124 and the MPC 174 that bypasses the hop-by-hop processing of the default path. The shortcut VCC 202 remains active as long as packets are being forwarded over the shortcut VCC 202, and is released after a predetermined period of inactivity in which no packets are forwarded over the shortcut VCC 202.

In accordance with the MPOA specification, the MPC 124 may establish the shortcut VCC 202 for a particular packet flow. For the purposes of the present invention, a packet flow exists when the MPC 124 receives, within a predetermined window of time, a predetermined number of packets meeting a predetermined set of packet flow criteria. Various packet flow criteria may be used to identify a packet flow. In one exemplary embodiment, a packet flow is identified by a number of packets addressed to a particular destination. In another exemplary embodiment, a packet flow is identified by a number of packets addressed to a particular source-destination pair. In yet another exemplary embodiment, a packet flow is identified by a number of packets having a particular protocol and addressed to a particular destination or source/destination pair. In still another exemplary embodiment, a packet flow is identified using a predetermined set of rules, conditions, or filters set forth in a verification table, as described in Reference 1. Of course, other packet flow criteria are possible, and the present invention is in no way limited to any particular set of packet flow criteria.

In order to select an appropriate path for each packet flow, the MPC 124 maintains information about each packet flow in an Ingress Cache 126. For each packet flow, the Ingress Cache 126 includes information such as packet count information and LLC encapsulation information, and also indicates whether a shortcut VCC exists for the packet flow. The Ingress Cache 126 may also include information such as packet flow thresholds used to determine when to establish a shortcut VCC and when to release a shortcut VCC.

In order to process any packets received over the shortcut VCC 202, the MPC 174 maintains information about each packet flow in an Egress Cache 176. The Egress Cache 176 includes, among other things, Data Link Layer (DLL) encapsulation information that is used by the MPC 174 to transmit the packet to the Destination End Device 180 over the LAN port.

Figure 3:
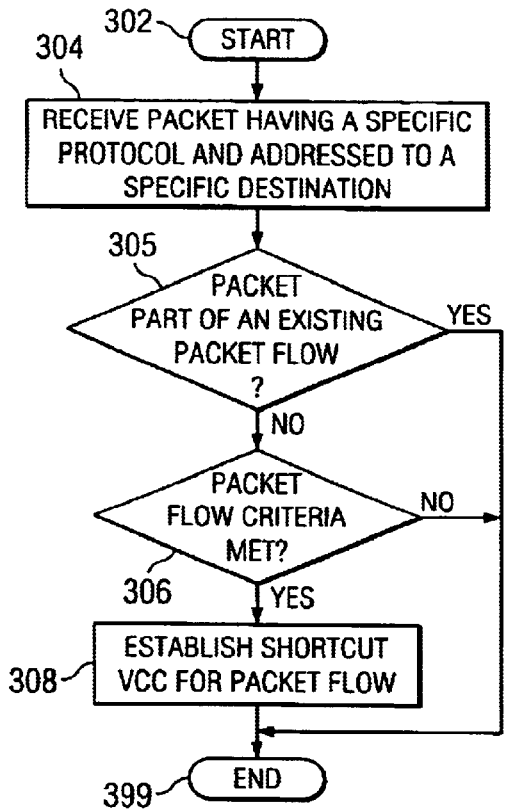
FIG. 3 is a logic flow diagram showing exemplary MPC logic for establishing the shortcut VCC as known in the prior art.

FIG. 3 is a logic flow diagram showing exemplary MPC 124 logic for establishing the shortcut VCC 202. The logic begins in step 302, and upon receiving a data packet having a particular protocol and addressed to a specific destination, in step 304, determines whether the packet is part of an existing packet flow, in step 305, specifically by checking the packet flow information stored in the Ingress Cache 126. If the packet is part of an existing packet flow (YES in step 305), then the logic terminates in step 399. However, assuming the packet is not part of an existing packet flow (NO in step 305), the logic proceeds to determine whether the packet is part of a new packet flow meeting predetermined packet flow criteria, in step 306. If the predetermined packet flow criteria are not met (NO in step 306), then the logic terminates in step 399. However, assuming the predetermined packet flow criteria are met (YES in step 306), then the logic establishes the shortcut VCC 202 for the packet flow, in step 308, and terminates in step 399.

Figure 4:
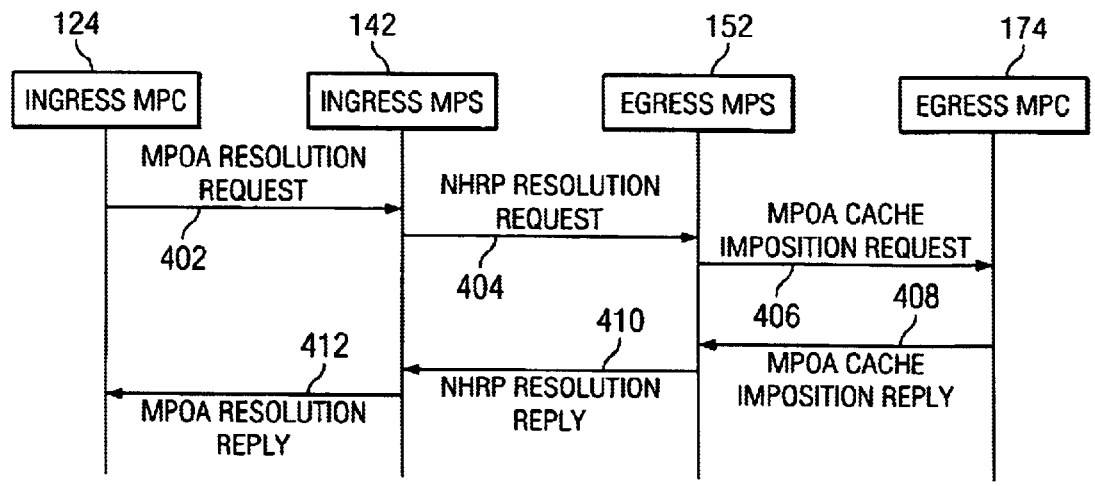
FIG. 4 is a message flow diagram showing the messages exchanged between the various network devices for establishing the shortcut VCC as known in the prior art.

FIG. 4 is a message flow diagram showing the messages exchanged between the various network devices for establishing the shortcut VCC 202 in step 308. In order to establish the shortcut VCC 202, the MPC 124 needs to obtain the ATM address corresponding to the packet destination. Therefore, the MPC 124 transmits an MPOA Resolution Request 402 to the MPS 142 via the default path. The MPS 142 forwards the request for the ATM address to the MPS 152 by transmitting an NHRP Resolution Request 404 to the MPS 152. The MPS 152 transmits an MPOA Cache Imposition Request 406 to the MPC 174, and the MPC 174 responds by transmitting an MPOA Cache Imposition Reply 408 to the MPS 152. The MPC 174 also updates the Egress Cache 176 to include, among other things, the DLL encapsulation information for the shortcut VCC 202. Upon receiving the MPOA Cache Imposition Reply 408, the MPS 152 transmits an NHRP Resolution Reply 410 to the MPS 142, which transmits an MPOA Resolution Reply 412 to the MPC 124 including, among other things, the ATM address corresponding to the packet destination. Upon receiving the MPOA Resolution Reply 412, the MPC 124 updates the Ingress Cache 126 to include, among other things, an indication that the shortcut VCC 202 has been established for the packet flow.

In a typical prior art embodiment, the shortcut establishment criteria (step 308) is based upon the packet flow rate of a packet flow. The packet flow rate is a determination of the number of flow packets received by the MPC 124 within a predetermined window of time. In a typical prior art embodiment, the MPC 124 establishes the shortcut VCC 202 if the packet flow rate meets predetermined packet flow rate criteria, for example, exceeding a predetermined packet flow rate threshold. In accordance with the MPOA specification, the packet flow rate threshold is defined by a pair of configurable parameters referred to as the "shortcut-setup frame count" parameter and the "shortcut-setup frame time" parameter. The shortcut-setup frame count parameter defines the number of packets that must be received within the predetermined window of time, and defaults to ten (10) packets. The shortcut-setup frame time parameter defines the time window, and defaults to one (1) second. Thus, in a prior art embodiment using default parameters, the MPC 124 establishes the shortcut VCC 202 for a packet flow whenever the packet flow rate reaches ten (10) packets per second.

Figure 5:
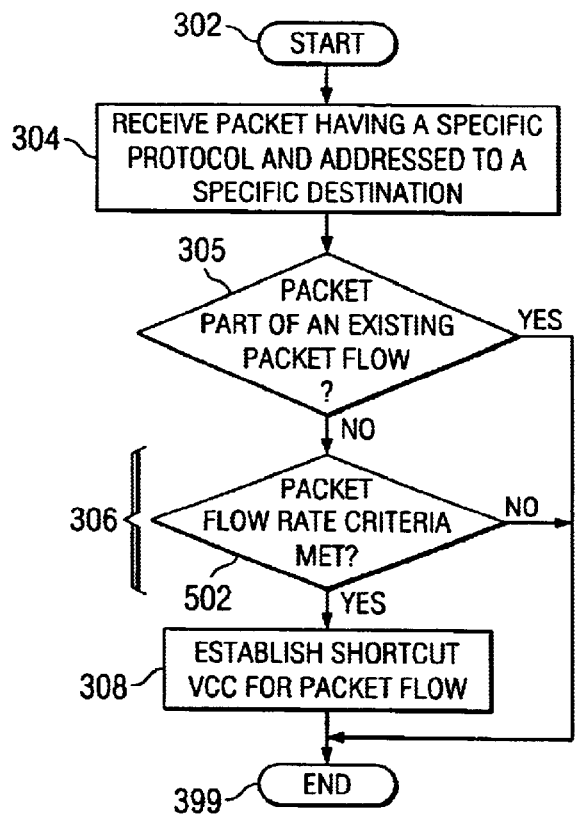
FIG. 5 is a logic flow diagram showing exemplary MPC logic for establishing the shortcut VCC in which the packet flow is detected using a packet flow rate filter as known in the prior art.

FIG. 5 is a logic flow diagram showing exemplary MPC 124 logic for establishing the shortcut VCC 202 in which the packet flow is detected using a packet flow rate filter. The logic begins in step 302, and upon receiving a data packet having a particular protocol and addressed to a specific destination, in step 304, determines whether the packet is part of an existing packet flow, in step 305, specifically by checking the packet flow information stored in the Ingress Cache 126. If the packet is part of an existing packet flow (YES in step 305), then the logic terminates in step 399. However, assuming the packet is not part of an existing packet flow (NO in step 305), the logic proceeds to determine whether the packet is part of a new packet flow meeting predetermined packet flow criteria, in step 306. Specifically, the logic determines whether the packet flow rate meets a predetermined packet flow rate criteria, in step 502, by computing a packet flow rate and comparing the packet flow rate with a predetermined packet flow rate threshold. If the packet flow rate does not meet the predetermined packet flow rate criteria (NO in step 502), then the logic terminates in step 399. However, assuming the packet flow rate does meet the predetermined packet flow rate criteria (YES in step 502), then the logic establishes the shortcut VCC 202 for the packet flow, in step 308, and terminates in step 399.

Figure 6:
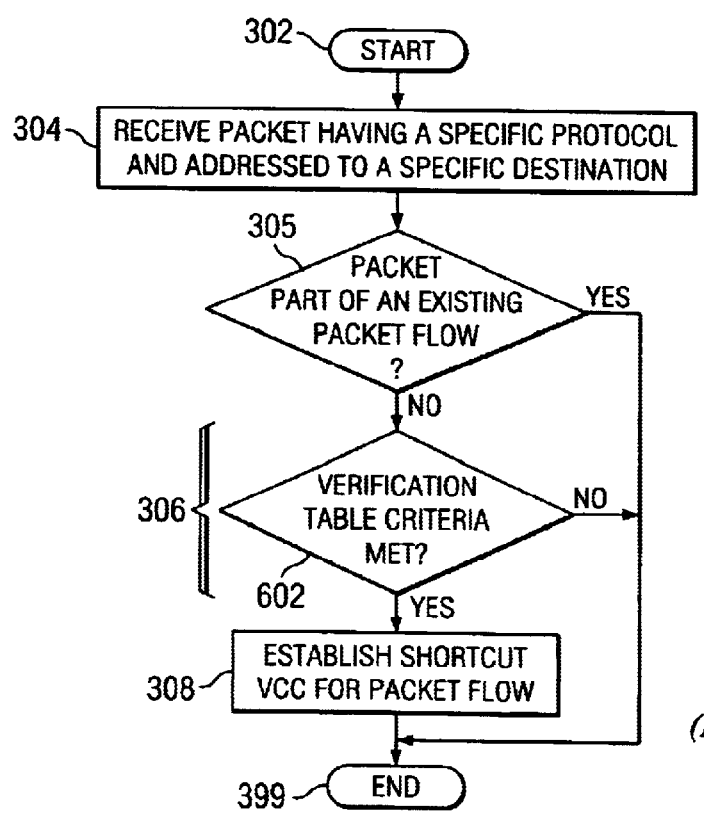
FIG. 6 is a logic flow diagram showing exemplary MPC logic for establishing the shortcut VCC in which the packet flow is detected using a verification table as known in the prior art.

FIG. 6 is a logic flow diagram showing exemplary MPC 124 logic for establishing the shortcut VCC 202 in which the packet flow is detected using a verification table as described in Reference 1. The logic begins in step 302, and upon receiving a data packet having a particular protocol and addressed to a specific destination, in step 304, determines whether the packet is part of an existing packet flow, in step 305, specifically by checking the packet flow information stored in the Ingress Cache 126. If the packet is part of an existing packet flow (YES in step 305), then the logic terminates in step 399. However, assuming the packet is not part of an existing packet flow (NO in step 305), the logic proceeds to determine whether the packet is part of a new packet flow meeting predetermined packet flow criteria, in step 306. Specifically, the logic uses a verification table to determine whether the packet flow meets a predetermined set of rules, conditions, or filters, in step 602. If the updated packet flow rate does not meet the predetermined set of rules, conditions, or filters defined in the verification table (NO in step 602), then the logic terminates in step 399. However, assuming the updated packet flow rate does meet the predetermined set of rules, conditions, or filters defined in the verification table (YES in step 602), then the logic establishes the shortcut VCC 202 for the packet flow, in step 308, and terminates in step 399.

Figure 7:
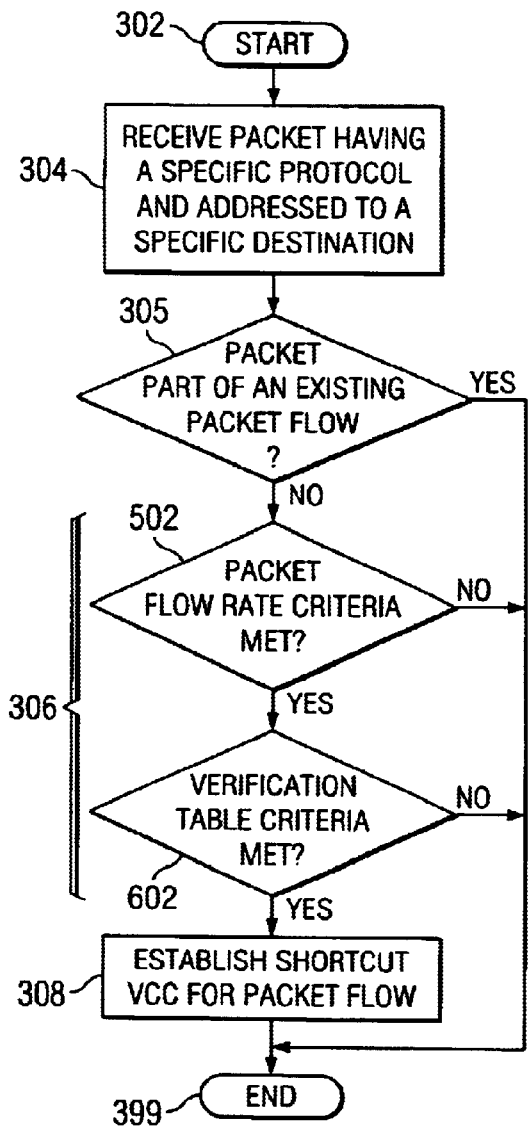
FIG. 7 is a logic flow diagram showing exemplary MPC logic for establishing the shortcut VCC in which the packet flow is detected using both a packet flow rate filter and a verification table as known in the prior art.

FIG. 7 is a logic flow diagram showing exemplary MPC 124 logic for establishing the shortcut VCC 202 in which the packet flow is detected using both a packet flow rate filter and a verification table. The logic begins in step 302, and upon receiving a data packet having a particular protocol and addressed to a specific destination, in step 304, determines whether the packet is part of an existing packet flow, in step 305, specifically by checking the packet flow information stored in the Ingress Cache 126. If the packet is part of an existing packet flow (YES in step 305), then the logic terminates in step 399. However, assuming the packet is not part of an existing packet flow (NO in step 305), the logic proceeds to determine whether the packet is part of a new packet flow meeting predetermined packet flow criteria, in step 306. Specifically, the logic determines whether the packet flow rate meets a predetermined packet flow rate criteria, in step 502, by computing a packet flow rate and comparing the packet flow rate with a predetermined packet flow rate threshold. If the packet flow rate does not meet the predetermined packet flow rate criteria (NO in step 502), then the logic terminates in step 399. However, assuming the packet flow rate does meet the predetermined packet flow rate criteria (YES in step 502), then the logic uses a verification table to determine whether the packet flow meets a predetermined set of rules, conditions, or filters, in step 602. If the updated packet flow rate does not meet the predetermined set of rules, conditions, or filters defined in the verification table (NO in step 602), then the logic terminates in step 399. However, assuming the updated packet flow rate does meet the predetermined set of rules, conditions, or filters defined in the verification table (YES in step 602), then the logic establishes the shortcut VCC 202 for the packet flow, in step 308, and terminates in step 399.

Figure 8:
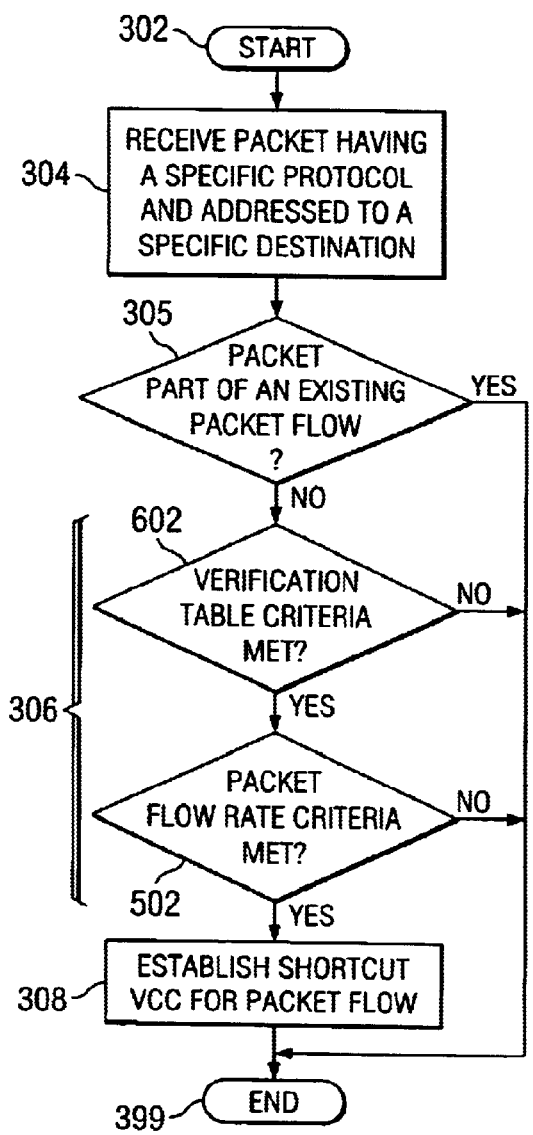
FIG. 8 is a logic flow diagram showing exemplary MPC logic for establishing the shortcut VCC in which the packet flow is detected using both a verification table and a packet flow rate filter as known in the prior art.

FIG. 8 is a logic flow diagram showing exemplary MPC 124 logic for establishing the shortcut VCC 202 in which the packet flow is detected using both a verification table and a packet flow rate filter. The logic begins in step 302, and upon receiving a data packet having a particular protocol and addressed to a specific destination, in step 304, determines whether the packet is part of an existing packet flow, in step 305, specifically by checking the packet flow information stored in the Ingress Cache 126. If the packet is part of an existing packet flow (YES in step 305), then the logic terminates in step 399. However, assuming the packet is not part of an existing packet flow (NO in step 305), the logic proceeds to determine whether the packet is part of a new packet flow meeting predetermined packet flow criteria, in step 306. Specifically, the logic first uses a verification table to determine whether the packet flow meets a predetermined set of rules, conditions, or filters, in step 602. If the packet flow does not meet the predetermined set of rules, conditions, or filters defined in the verification table (NO in step 602), then the logic terminates in step 399. However, assuming the packet flow does meet the predetermined set of rules, conditions, or filters defined in the verification table (YES in step 602), then the logic determines whether the packet flow rate meets a predetermined packet flow rate criteria, in step 502, by computing a packet flow rate and comparing the packet flow rate with a predetermined packet flow rate threshold. If the packet flow rate does not meet the predetermined packet flow rate criteria (NO in step 502), then the logic terminates in step 399. However, assuming the packet flow rate does meet the predetermined packet flow rate criteria (YES in step 502), then the logic establishes the shortcut VCC 202 for the packet flow, in step 308, and terminates in step 399.

One problem with these and other prior art embodiments is that the shortcut VCC 202 may be obsolete by the time it is established. This is because it can take a significant amount of time to establish a shortcut VCC using the procedure shown in FIG. 4. Moreover, the amount of time it takes to establish a shortcut VCC may vary based on the destination and other network conditions. As a result, the shortcut VCC 202 may benefit certain flows while being useless to other flows.

Therefore, various embodiments of the present invention account for the amount of time it takes to establish a shortcut VCC when deciding whether or not to establish the shortcut VCC 202. Specifically, the MPC 124 maintains a history of MPS 142 response times over some window of time. Before establishing the shortcut VCC 202 for the packet flow (step 308), the MPC 124 utilizes an MPS response time filter to determine whether an expected MPS response time (based upon the history of MPS response times) is within a predetermined MPS response time threshold. The predetermined MPS response time threshold may be a fixed value, or may be selected dynamically by a resource filter based upon the packet protocol, the packet destination, the packet source-destination pair, the packet flow rate, resource utilization information, and/or other criteria. By only establishing the shortcut VCC 202 when the expected MPS response time is within the predetermined MPS response time threshold, the MPC 124 improves the likelihood that the shortcut VCC 202 will benefit the particular packet flow.

Figure 9:
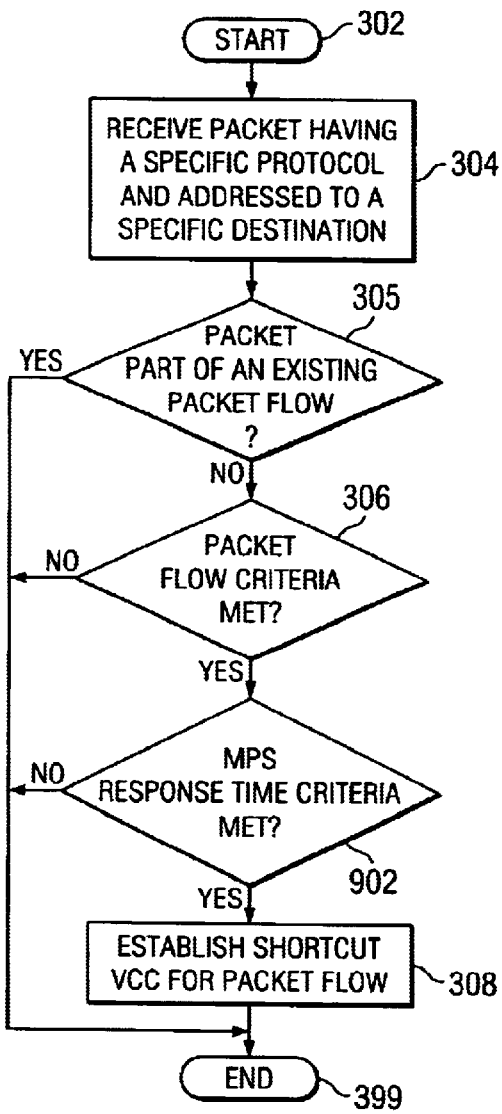
FIG. 9 is a logic flow diagram showing an exemplary embodiment of MPC logic that utilizes an MPS response time filter for determining whether to establish the shortcut VCC in accordance with the present invention.

FIG. 9 is a logic flow diagram showing an exemplary embodiment of MPC 124 logic that utilizes an MPS response time filter for determining whether to establish the shortcut VCC 202. The logic begins in step 302, and upon receiving a data packet having a particular protocol and addressed to a specific destination, in step 304, determines whether the packet is part of an existing packet flow, in step 305, specifically by checking the packet flow information stored in the Ingress Cache 126. If the packet is part of an existing packet flow (YES in step 305), then the logic terminates in step 399. However, assuming the packet is not part of an existing packet flow (NO in step 305), the logic proceeds to determine whether the packet is part of a new packet flow meeting predetermined packet flow criteria, in step 306, specifically using a packet flow rate filter, a verification table filter, or a combination of a packet flow rate filter and a verification table filter, as shown in FIGS. 12 through 15. If the predetermined packet flow criteria are not met (NO in step 306), then the logic terminates in step 399. However, assuming the predetermined packet flow criteria are met (YES in step 306), then the logic determines whether the expected MPS response time is within a predetermined MPS response time threshold, in step 902. If the MPS response time is not within the predetermined MPS response time threshold (NO in step 902), then the logic terminates in step 399. However, assuming the MPS response time is within the predetermined MPS response time threshold (YES in step 902), then the logic establishes the shortcut VCC 202 for the packet flow, in step 308, and terminates in step 399.

Figure 10:
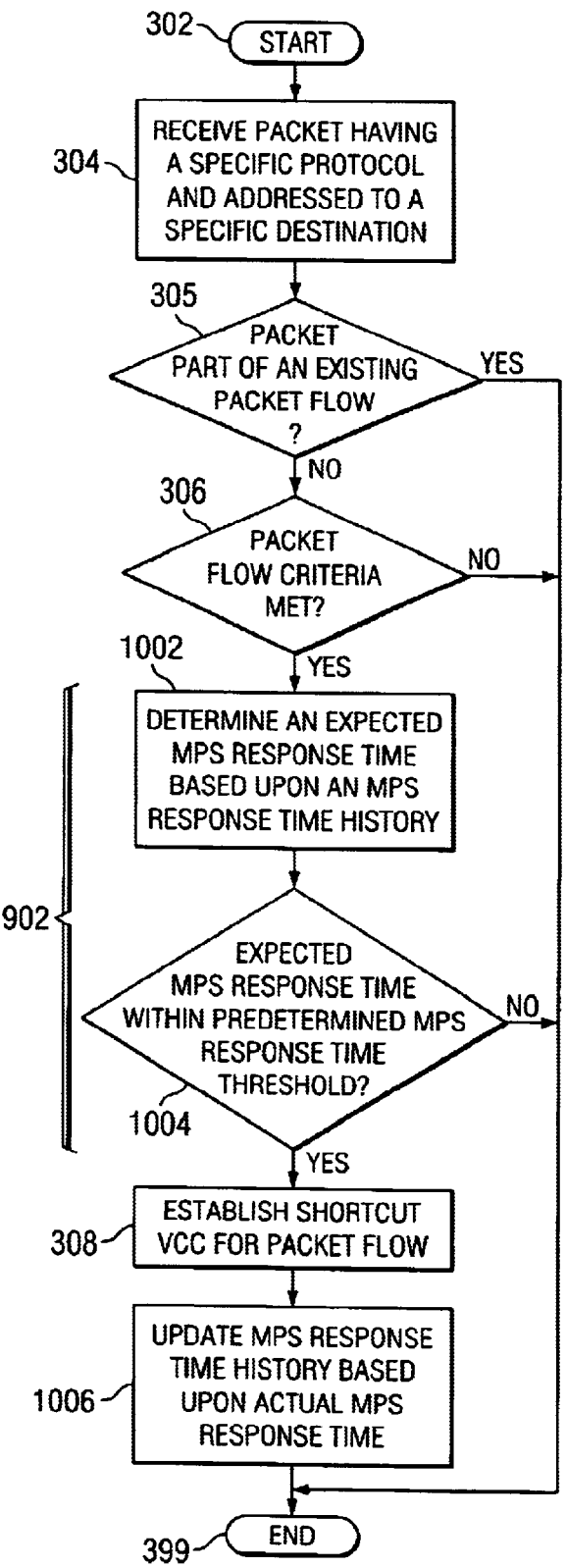
FIG. 10 is a logic flow diagram showing, in greater detail, an exemplary embodiment of MPC logic that utilizes an MPS response time filter for determining whether to establish the shortcut VCC in accordance with the present invention.

FIG. 10 is a logic flow diagram showing, in greater detail, an exemplary embodiment of MPC 124 logic that utilizes an MPS response time filter for determining whether to establish the shortcut VCC 202. The logic begins in step 302, and upon receiving a data packet having a particular protocol and addressed to a specific destination, in step 304, determines whether the packet is part of an existing packet flow, in step 305, specifically by checking the packet flow information stored in the Ingress Cache 126. If the packet is part of an existing packet flow (YES in step 305), then the logic terminates in step 399. However, assuming the packet is not part of an existing packet flow (NO in step 305), the logic proceeds to determine whether the packet is part of a new packet flow meeting predetermined packet flow criteria, in step 306, specifically using a packet flow rate filter, a verification table filter, or a combination of a packet flow rate filter and a verification table filter, as shown in FIGS. 12 through 15. If the predetermined packet flow criteria are not met (NO in step 306), then the logic terminates in step 399. However, assuming the predetermined packet flow criteria are met (YES in step 306), then the logic determines whether the expected MPS response time is within a predetermined MPS response time threshold, in step 902. Specifically, the logic determines an expected MPS response time based upon an MPS response time history maintained by the MPC 124, in step 1002. The logic then compares the expected MPOA server response time to the predetermined MPOA server response time threshold to determine whether the expected MPOA server response time is within the predetermined MPOA server response time threshold, in step 1004. If the MPS response time is not within the predetermined MPS response time threshold (NO in step 1004), then the logic terminates in step 399. However, assuming the MPS response time is within the predetermined MPS response time threshold (YES in step 1004), then the logic establishes the shortcut VCC 202 for the packet flow, in step 308. The logic then updates the MPS response time history based upon the actual MPS response time incurred when establishing the shortcut VCC 202 for the packet flow in step 308. The logic terminates in step 399.

Figure 11:
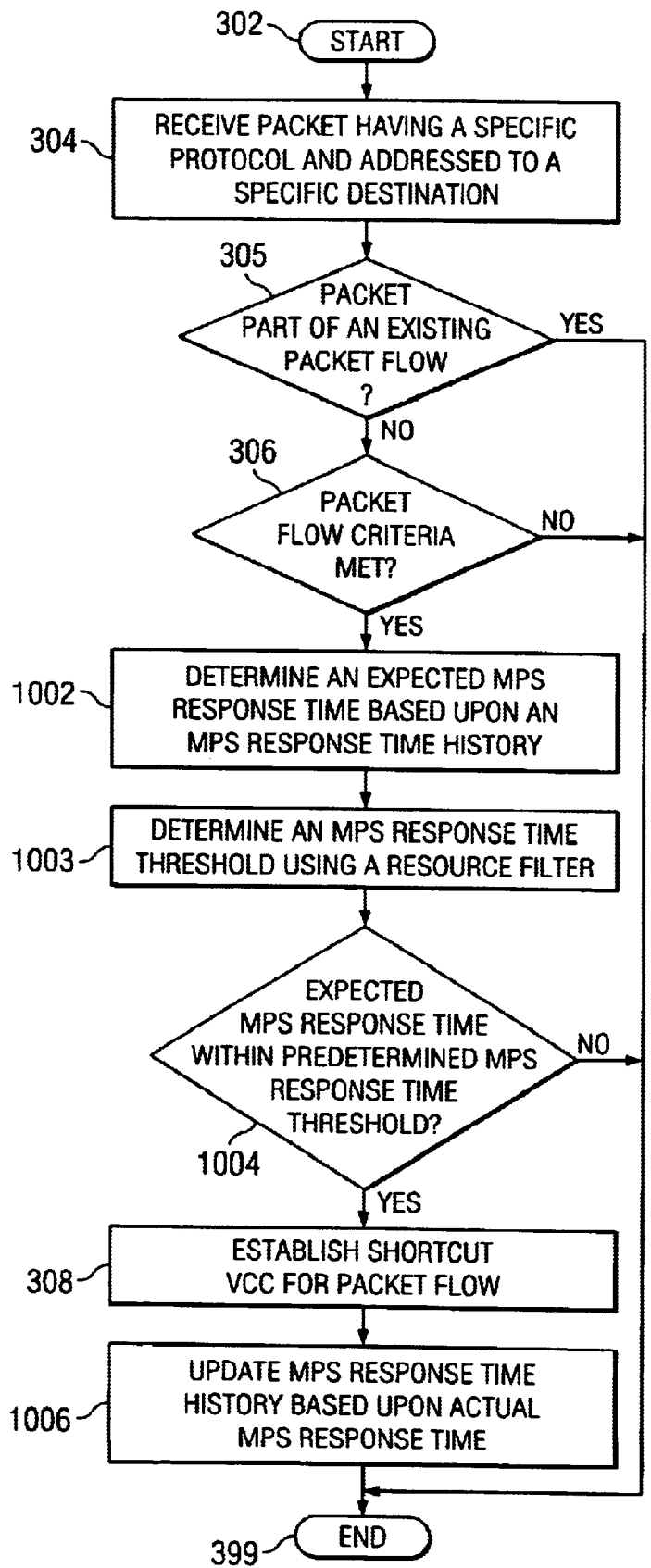
FIG. 11 is a logic flow diagram showing an exemplary embodiment of MPC logic that utilizes a resource filter for dynamically determining the MPS response time threshold in accordance with the present invention.

FIG. 11 is a logic flow diagram showing an exemplary embodiment of MPC 124 logic that utilizes a resource filter for dynamically determining the MPS response time threshold. The logic begins in step 302, and upon receiving a data packet having a particular protocol and addressed to a specific destination, in step 304, determines whether the packet is part of an existing packet flow, in step 305, specifically by checking the packet flow information stored in the Ingress Cache 126. If the packet is part of an existing packet flow (YES in step 305), then the logic terminates in step 399. However, assuming the packet is not part of an existing packet flow (NO in step 305), the logic proceeds to determine whether the packet is part of a new packet flow meeting predetermined packet flow criteria, in step 306, specifically using a packet flow rate filter, a verification table filter, or a combination of a packet flow rate filter and a verification table filter, as shown in FIGS. 12 through 15. If the predetermined packet flow criteria are not met (NO in step 306), then the logic terminates in step 399. However, assuming the predetermined packet flow criteria are met (YES in step 306), then the logic determines whether the expected MPS response time is within a predetermined MPS response time threshold, in step 902. Specifically, the logic determines an expected MPS response time based upon an MPS response time history maintained by the MPC 124, in step 1002. The logic also determines the MPS response time threshold, in step 1003, preferably using a resource filter that determines the MPS response time threshold based upon, among other things, packet flow characteristics and resource utilization information. The logic then compares the expected MPOA server response time to the predetermined MPOA server response time threshold to determine whether the expected MPOA server response time is within the predetermined MPOA server response time threshold, in step 1004. If the MPS response time is not within the predetermined MPS response time threshold (NO in step 1004), then the logic terminates in step 399. However, assuming the MPS response time is within the predetermined MPS response time threshold (YES in step 1004), then the logic establishes the shortcut VCC 202 for the packet flow, in step 308. The logic then updates the MPS response time history based upon the actual MPS response time incurred when establishing the shortcut VCC 202 for the packet flow in step 308. The logic terminates in step 399.

Figure 12:
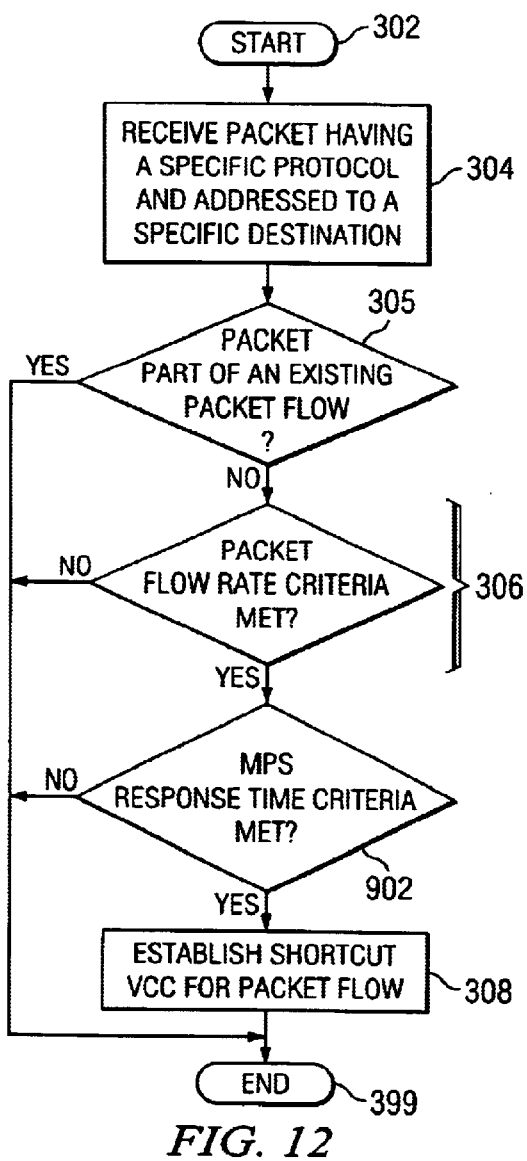
FIG. 12 is a logic flow diagram showing an exemplary embodiment of MPC logic that utilizes a packet flow rate filter for determining whether the predetermined packet flow criteria are met, and utilizes an MPS response time filter for determining whether to establish the shortcut VCC in accordance with the present invention.

FIG. 12 is a logic flow diagram showing an exemplary embodiment of MPC 124 logic that utilizes a packet flow rate filter for determining whether the predetermined packet flow criteria are met, and utilizes an MPS response time filter for determining whether to establish the shortcut VCC 202. The MPS response time filter may use either a fixed MPS response time threshold, or, as shown in FIG. 11, may use a resource filter to dynamically determine the MPS response time threshold.

Figure 13:
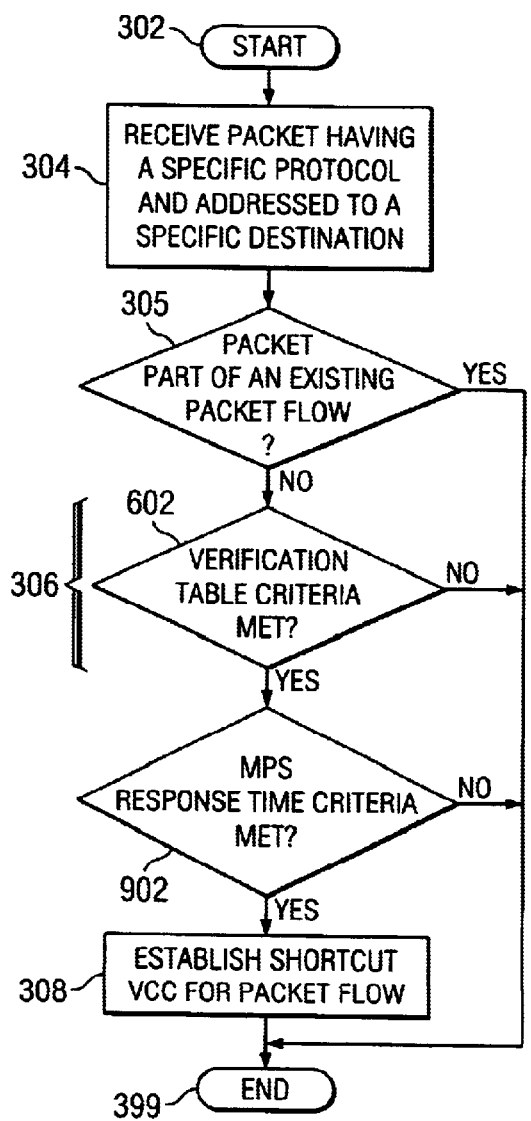
FIG. 13 is a logic flow diagram showing an exemplary embodiment of MPC logic that utilizes a verification table filter for determining whether the predetermined packet flow criteria are met, and utilizes an MPS response time filter for determining whether to establish the shortcut VCC in accordance with the present invention.

FIG. 13 is a logic flow diagram showing an exemplary embodiment of MPC 124 logic that utilizes a verification table filter for determining whether the predetermined packet flow criteria are met, and utilizes an MPS response time filter for determining whether to establish the shortcut VCC 202. The MPS response time filter may use either a fixed MPS response time threshold, or, as shown in FIG. 11, may use a resource filter to dynamically determine the MPS response time threshold.

Figure 14:
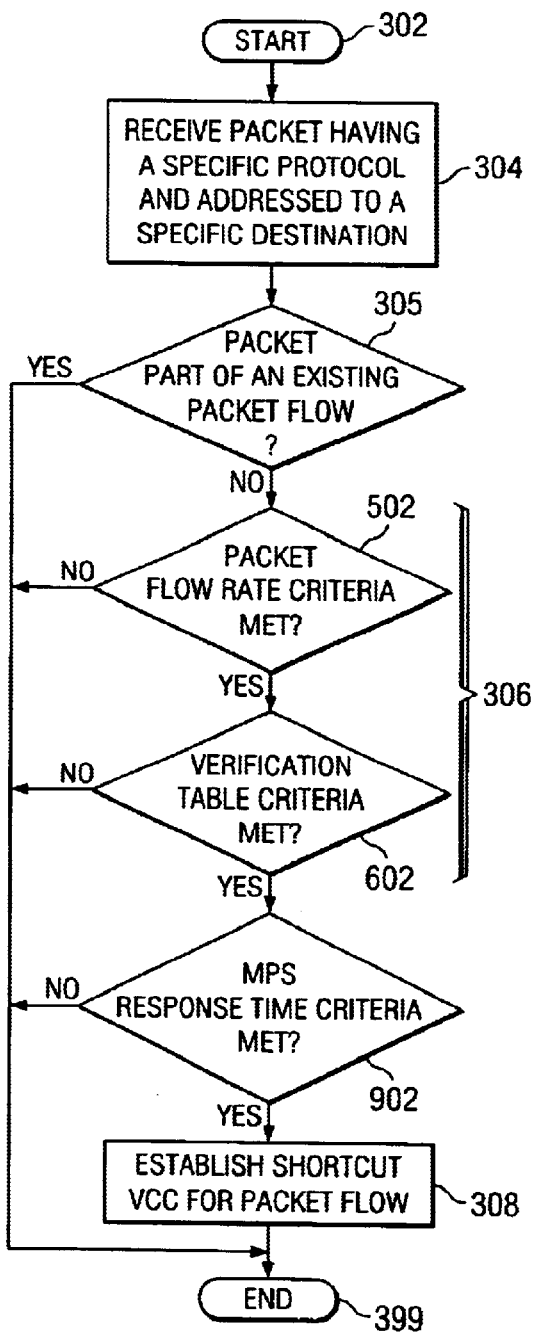
FIG. 14 is a logic flow diagram showing an exemplary embodiment of MPC logic that utilizes a packet flow rate filter and a verification table filter for determining whether the predetermined packet flow criteria are met, and utilizes an MPS response time filter for determining whether to establish the shortcut VCC in accordance with the present invention.

FIG. 14 is a logic flow diagram showing an exemplary embodiment of MPC 124 logic that utilizes a packet flow rate filter and a verification table filter for determining whether the predetermined packet flow criteria are met, and utilizes an MPS response time filter for determining whether to establish the shortcut VCC 202. The MPS response time filter may use either a fixed MPS response time threshold, or, as shown in FIG. 11, may use a resource filter to dynamically determine the MPS response time threshold.

Figure 15:
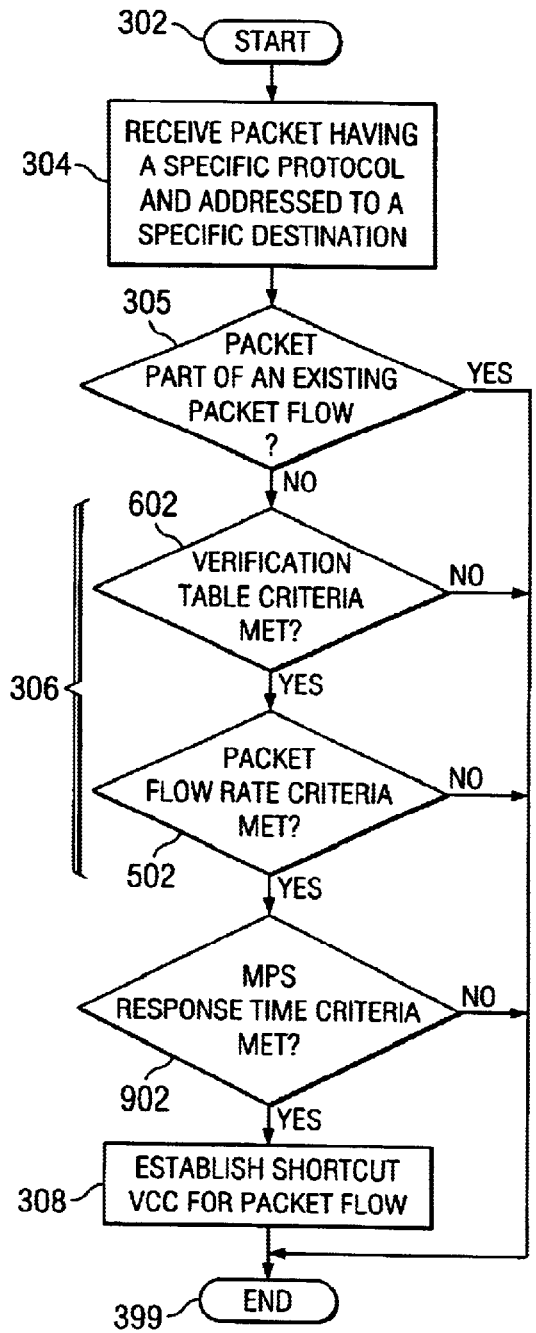
FIG. 15 is a logic flow diagram showing an exemplary embodiment of MPC logic that utilizes a verification table filter and a packet flow rate filter for determining whether the predetermined packet flow criteria are met, and utilizes an MPS response time filter for determining whether to establish the shortcut VCC in accordance with the present invention.

FIG. 15 is a logic flow diagram showing an exemplary embodiment of MPC 124 logic that utilizes a verification table filter and a packet flow rate filter for determining whether the predetermined packet flow criteria are met, and utilizes an MPS response time filter for determining whether to establish the shortcut VCC 202. The MPS response time filter may use either a fixed MPS response time threshold, or, as shown in FIG. 11, may use a resource filter to dynamically determine the MPS response time threshold.

Figure 16:
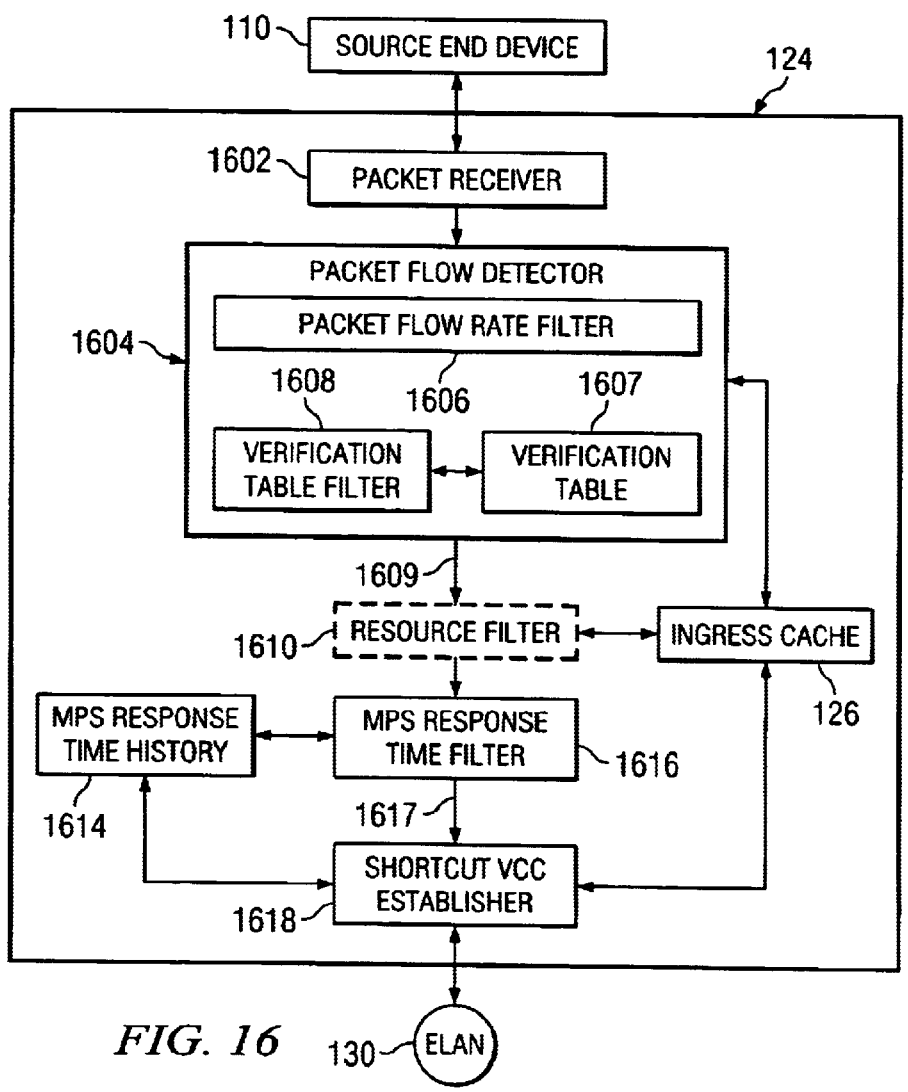
FIG. 16 is a block diagram showing the logic blocks of an exemplary MPC for establishing the shortcut VCC in accordance with the present invention.

FIG. 16 is a block diagram showing the logic blocks of an exemplary MPC 124 for establishing the shortcut VCC 202 in accordance with the present invention. The MPC 124 includes a Packet Receiver 1602 for receiving packets from the Source End Device 110. Each packet typically includes a source identifier, a destination identifier, and a protocol identifier.

The received packets are processed by a Packet Flow Detector 1604, which detects a packet flow based upon a predetermined set of packet flow criteria. In various embodiments of the present invention, the Packet Flow Detector 1604 includes a Packet Flow Rate Filter 1606 for determining whether the packet flow meets a predetermined packet flow rate and/or a Verification Table Filter 1608 for determining whether the packet flow meets a predetermined set of rules, conditions, or filters defined in a Verification Table 1607. The Packet Flow Detector 1604 is coupled to the Ingress Cache 126 for, among other things, storing and retrieving packet flow information, such as packet count information and various packet flow thresholds. The Packet Flow Detector 1604 is operably coupled to generate a flow detection signal 1609 upon detecting the packet flow.

The flow detection signal 1609 signals or otherwise prompts an MPS response time filter 1616 to determine whether an expected MPS response time is within a predetermined MPS response time threshold. Various embodiments of the present invention utilize an optional Resource Filter 1610 to determine the MPS response time threshold dynamically based upon, for example, packet flow characteristics and resource utilization information stored in the Ingress Cache 126. The MPS Response Time Filter 1616 determines the expected MPS response time based upon MPS response time information stored in an MPS Response Time History 1614. The MPS Response Time Filter 1616 compares the expected MPS response time to the predetermined MPS response time threshold to determine whether the expected MPS response time is within the predetermined MPS response time threshold. The MPS Response Time Filter 1616 is operably coupled to generate a shortcut establishment signal 1617 upon determining that the expected MPS response time is within the predetermined MPS response time threshold.

The shortcut establishment signal 1617 signals or otherwise prompts a Shortcut VCC Establisher 1618 to establish the shortcut VCC 202. Specifically, the Shortcut VCC Establisher 1618 transmits the MPOA Resolution Request 402 over the ELAN 130, and receives the MPOA Resolution Reply 412 over the ELAN 130. Upon receiving the MPOA Resolution Reply 412, the Shortcut VCC Establisher updates the packet flow information in the Ingress Cache 126 to indicate that the shortcut VCC 202 has been established, and also updates the MPS response time information stored in the MPS Response Time History 1614 based upon the actual MPS response time incurred while establishing the shortcut VCC 202.

Additional logic within the MPC 124 (not shown) forwards packets over the shortcut VCC 202 and releases the shortcut VCC 202 when no packets have been forwarded over the shortcut VCC 202 within a predetermined period of time.

In a preferred embodiment of the present invention, predominantly all of the MPC 124 logic is implemented as a set of computer program instructions that are stored in a computer readable medium and executed by an embedded microprocessor system within the Ingress Edge Device 120. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a method for establishing a shortcut VCC between a source and a destination by detecting a packet flow, determining an expected MPOA server response time, comparing the expected MPOA server response time to a predetermined MPOA server response time threshold to determine whether the expected MPOA server response time is within the predetermined MPOA server response time threshold, determining that the expected MPOA server response time is within the predetermined MPOA server response time threshold, and establishing the shortcut VCC between the source and the destination. One embodiment of the present invention detects the packet flow by determining that a packet flow rate meets predetermined packet flow rate criteria. Another embodiment of the present invention detects the packet flow by determining that the packet flow meets a predetermined set of criteria defined in a verification table. Yet another embodiment of the present invention detects the packet flow by determining that a packet flow rate exceeds a predetermined packet flow rate threshold and determining that the packet flow meets a predetermined set of criteria defined in a verification table. In order to determine the expected MPOA server response time, the method maintains a MPOA server response time history and determines the expected MPOA server response time based upon the MPOA server response time history. One embodiment of the present invention utilizes a fixed predetermined MPOA server response time threshold. Another embodiment of the present invention uses a resource filter to determine the MPOA server response time threshold based upon packet flow characteristics, resource utilization information, or other criteria. The method updates the MPOA server response time history based upon an actual MPOA server response time incurred when establishing the shortcut VCC between the source and the destination.

The present invention may also be embodied in an apparatus for establishing a shortcut VCC in an MPOA system, wherein the apparatus includes a packet receiver operably coupled to receive packets, a packet flow detector responsive to the packet receiver and operably coupled to detect a packet flow based upon a predetermined set of packet flow criteria, an MPOA server response time filter responsive to the packet flow detector and operably coupled to determine whether an expected MPOA server response time is within a predetermined MPOA server response time threshold, and a shortcut VCC establisher responsive to the MPOA server response time filter and operably coupled to establish the shortcut VCC when the expected MPOA server response time is within the predetermined MPOA server response time threshold. In various embodiments of the present invention, the packet flow detector includes a packet flow rate filter for determining whether the packet flow meets predetermined packet flow rate criteria and/or a verification table filter for determining whether the packet flow meets a predetermined set of rules, conditions, or filters defined in a verification table. The apparatus optionally includes a resource filter for determining the MPOA server response time threshold dynamically based upon a predetermined set of criteria. The apparatus includes an MPOA server response time history for storing MPOA server response time information. The MPOA server response time filter is coupled to the MPOA server response time history for retrieving the MPOA server response time information for use in determining the expected MPOA server response time. The shortcut VCC establisher is coupled to the MPOA server response time history for updating the MPOA server response time information based upon an actual MPOA server response time incurred when establishing the shortcut VCC.

Additionally, the present invention may be embodied in a program product comprising a computer readable medium having embodied therein a computer readable program for establishing a shortcut Virtual Channel Connection (VCC) in a Multi-Protocol Over ATM (MPOA) system, wherein the computer readable program includes packet receiving logic programmed to receive packets, packet flow detection logic responsive to the packet receiving logic and programmed to detect a packet flow based upon a predetermined set of packet flow criteria, MPOA server response time filter logic responsive to the packet flow detection logic and programmed to determine whether an expected MPOA server response time is within a predetermined MPOA server response time threshold, and shortcut VCC establishment logic responsive to the MPOA server response time filter logic and programmed to establish the shortcut VCC when the expected MPOA server response time is within the predetermined MPOA server response time threshold. In various embodiments of the present invention, the packet flow detection logic includes packet flow rate filter logic programmed to determine whether the packet flow meets predetermined packet flow rate criteria and/or verification table filter logic programmed to retrieve the predetermined set of criteria from a verification table and determine whether the packet flow meets the predetermined set of criteria. The computer readable program optionally includes resource filter logic for determining the MPOA server response time threshold. The MPOA server response time filter logic is programmed to retrieve MPOA server response time information from an MPOA server response time history and determine the expected MPOA server response time based upon the MPOA server response time information. The shortcut VCC establishment logic is programmed to update the MPOA server response time history based upon an actual MPOA server response time incurred when establishing the shortcut VCC.

Furthermore, the present invention may be embodied in an MPOA system including an ingress MPOA client in communication with an egress MPOA client by way of at least one MPOA server in an ATM network, wherein the ingress MPOA client establishes a shortcut VCC to the egress MPOA client upon detecting a packet flow and determining that an expected MPOA server response time is within a predetermined MPOA server response time threshold. In various embodiments of the present invention, the ingress MPOA client detects the packet flow based upon a predetermined set of packet criteria and/or a predetermined set of criteria defined in a verification table. In order to determine that the expected MPOA server response time is within the predetermined MPOA server response time threshold, the ingress MPOA client determines the expected MPOA server response time based upon MPOA server response time information stored in an MPOA server response time history, and may determine the MPOA server response time threshold dynamically using a resource filter. The ingress MPOA client updates the MPOA server response time information stored in the MPOA server response time history to reflect an actual MPOA server response time incurred when establishing the shortcut VCC.

The present invention may be embodied in other specific forms without departing from the essence or essential characteristics. The described embodiments are to be considered in all respects only as illustrative and not restrictive.

We claim:

1. In a Multiprotocol-over-ATM (MPOA) client, a method for establishing a shortcut Virtual Channel Connection (VCC) between a source and a destination, the method comprising the steps of:
   detecting a packet flow, comprising,
      determining that a packet flow rate exceeds a predetermined packet flow rate threshold, and
      determining that the packet flow meets a predetermined set of criteria defined in a verification table;
   determining an expected MPOA server response time;
   comparing the expected MPOA server response time to a predetermined MPOA server response time threshold to determine whether the expected MPOA server response time is within the predetermined MPOA server response time threshold; and
   responsive to determining that the expected MPOA server response time is within the predetermined MPOA server response time threshold, establishing the shortcut VCC between the source and the destination.

2. In a Multiprotocol-over-ATM (MPOA) client, a method for establishing a shortcut Virtual Channel Connection (VCC) between a source and a destination, the method comprising the step of:
   detecting a packet flow;
   determining an expected MPOA server response time, comprising,
      maintaining a MPOA server response time history, and
      determining the expected MPOA server response time based upon the MPOA server response time history;
   comparing the expected MPOA server response time to a predetermined MPOA server response time threshold to determine whether the expected MPOA server response time is within the predetermined MPOA server response time threshold; and
   responsive to determining that the expected MPOA server response time is within the predetermined MPOA server response time threshold, establishing the shortcut VCC between the source and the destination.

3. The method of claim 2 further comprising the step of:
   updating the MPOA server response time history based upon an actual MPOA server response time incurred when establishing the shortcut VCC between the source and the destination.

4. In a Multiprotocol-over-ATM (MPOA) client, a method for establishing a shortcut Virtual Channel Connection (VCC) between a source and a destination, the method comprising the steps of:
   detecting a packet flow;
   determining an expected MPOA server response time;
   determining a MPOA server response time threshold for the packet flow, comprising,
      determining the MPOA server response time threshold based upon a resource filter;
   comparing the expected MPOA server response time to the MPOA server response time threshold to determine whether the expected MPOA server response time is within the predetermined MPOA server response time threshold; and
   responsive to determining that the expected MPOA sever response time is within the predetermined MPOA server response time threshold, establishing the shortcut VCC between the source and the destination.

5. The method of claim 4 wherein the resource filter determines the MPOA server response time based upon packet flow characteristics.

6. The method of claim 4 wherein the resource filter determines the MPOA server response time based upon resource utilization information.

7. An apparatus for establishing a shortcut Virtual Channel Connection (VCC) in a Multi-Protocol Over ATM (MPOA) system, the apparatus comprising:
   a packet receiver operably coupled to receive packets;
   a packet flow detector responsive to the packet receiver and operably coupled to detect a packet flow based upon a predetermined set of packet flow criteria;
   an MPOA server response time filter responsive to the packet flow detector and operably coupled to determine whether an expected MPOA server response time is within a predetermined MPOA server response time threshold;
   a shortcut VCC establisher responsive to the MPOA server response time filter and operably coupled to establish the shortcut VCC when the expected MPOA server response time is within the predetermined MPOA server response time threshold; and
   an MPOA server response time history containing MPOA server response time information.

8. The apparatus of claim 7 wherein the MPOA server response time filter is operably coupled to obtain the MPOA server response time information from the MPOA server response time history and determine the expected MPOA server response time based upon the MPOA server response time information.

9. The apparatus of claim 7 wherein the shortcut VCC establisher is operably coupled to update the MPOA server response time history based upon an actual MPOA server response time incurred when establishing the shortcut VCC.

10. An apparatus for establishing a shortcut Virtual Channel Connection (VCC) in a Multi-Protocol Over ATM (MPOA) system, the apparatus comprising:
   a packet receiver operably coupled to receive packets;
   a packet flow detector responsive to the packet receiver and operably coupled to detect a packet flow based upon a predetermined set of packet flow criteria;
   an MPOA server response time filter responsive to the packet flow detector and operably coupled to determine whether an expected MPOA server response time is within a predetermined MPOA server response time threshold;
   a shortcut VCC establisher responsive to the MPOA server response time filter and operably coupled to establish the shortcut VCC when the expected MPOA server response time is within the predetermined MPOA server response time threshold; and a resource filter operably coupled to determine the MPOA server response time threshold.

11. The apparatus of claim 10 wherein the MPOA server response time filter is operably coupled to obtain the MPOA server response time threshold from the resource filter.

12. An apparatus for establishing a shortcut Virtual Channel Connection (VCC) in a Multi-Protocol Over ATM (MPOA) system, the apparatus comprising:

means for receiving packets;

means, responsive to and operably coupled to the means for receiving packets, for detecting a packet flow based upon a predetermined set of packet flow criteria;

means, responsive to and operably coupled to the means for detecting, for determining whether an expected MPOA server response time is within a predetermined MPOA server response time threshold, comprising, means for determining the expected MPOA server response time based upon MPOA server response time information stored in an MPOA server response time history, means, responsive to and operably coupled to the means for determining, for establishing the shortcut VCC when the expected MPOA server response time is within the predetermined MPOA server response time threshold.

13. The apparatus of claim 12 further comprising means for determining the MPOA server response time threshold.

14. The apparatus of claim 13 wherein the means for determining the MPOA server response time threshold comprises resource filter means.

15. A program product comprising a computer readable medium having embodied therein a computer readable program for establishing a shortcut Virtual Channel Connection (VCC) in a Multi-Protocol Over ATM (MPOA) system, the computer readable program comprising:

packet receiving logic programmed to receive packets;

packet flow detection logic responsive to the packet receiving logic and programmed to detect a packet flow based upon a predetermined set of packet flow criteria;

MPOA server response time filter logic responsive to the packet flow detection logic and programmed to determine whether an expected MPOA server response time is within a predetermined MPOA server response time threshold, and wherein the MPOA server response time filter logic is programmed to retrieve MPOA server response time information from an MPOA server response time history and determine the expected MPOA server response time based upon the MPOA server response time information; and shortcut VCC establishment logic responsive to the MPOA server response time filter logic and programmed to establish the shortcut VCC when the expected MPOA server response time is within the predetermined MPOA server response time threshold.

16. The program product of claim 15 wherein the shortcut VCC establishment logic is programmed to update the MPOA server response time history based upon an actual MPOA server response time incurred when establishing the shortcut VCC.

17. A program product comprising a computer readable medium having embodied therein a computer readable program for establishing a shortcut Virtual Channel Connection (VCC) in a Multi-Protocol Over ATM (MPOA) system, the computer readable program comprising:

packet receiving logic programmed to receive packets;

packet flow detection logic responsive to the packet receiving logic and programmed to detect a packet flow based upon a predetermined set of packet flow criteria;

MPOA server response time filter logic responsive to the packet flow detection logic and programmed to determine whether an expected MPOA server response time is within a predetermined MPOA server response time threshold;

shortcut VCC establishment logic responsive to the MPOA server response time filter logic and programmed to establish the shortcut VCC when the expected MPOA server response time is within the predetermined MPOA server response time threshold; and resource filter logic programmed to determine the MPOA server response time threshold.

18. The program product of claim 17 wherein the MPOA server response time filter logic is programmed to obtain the MPOA server response time threshold from the resource filter logic.

19. A program product comprising a computer readable medium having embodied therein a computer readable program for establishing a shortcut Virtual Channel Connection (VCC) in a Multi-Protocol Over ATM (MPOA) system, the computer readable program comprising:

computer readable program code means for receiving packets;

computer readable program code means, responsive to the means for receiving packets, for detecting a packet flow based upon a predetermined set of packet flow criteria;

computer readable program code means, responsive to means for detecting the packet flow, for determining that an expected MPOA Server response time is within a predetermined MPOA server response time threshold, the means for determining comprising, computer readable program code means for determining the expected MPOA server response time based upon MPOA server response time information stored in an MPOA server response time history, and computer readable program code means, responsive to the means for determining, for establishing the shortcut VCC when the expected MPOA server response time is within the predetermined MPOA server response time threshold.

20. The program product of claim 19 wherein the computer readable program code means for determining that the expected MPOA server response tie is within the predetermined MPOA server response time threshold further comprises:

computer readable program code means for determining the MPOA server response time threshold.

21. The program product of claim 20 wherein the computer readable program code means for determining the MPOA server response time threshold comprises a resource filter means.

22. A Multi-Protocol Over ATM (MPOA) system comprising an ingress MPOA client in communication with an egress MPOA client by way of at least one MPOA sever within an ATM network, wherein the ingress MPOA client establishes a shortcut Virtual Channel Connection (VCC) to the egress MPOA client upon detecting a packet flow and determining that an expected MPOA server response time is within a predetermined MPOA server response time threshold, and wherein the ingress MPOA client determines the predetermined MPOA server response time threshold using a resource filter.

23. A Multi-Protocol Over ATM (MPOA) system comprising an ingress MPOA client in communication with an egress MPOA client by way of at least one MPOA server within an ATM network, wherein the ingress MPOA client establishes a shortcut Virtual Channel Connection (VCC) to the egress MPOA client upon detecting a packet flow and determining that an expected MPOA server response time is within a predetermined MPOA server response time threshold, and wherein the ingress MPOA client determines the expected MPOA server response time based upon MPOA server response time information stored in an MPOA server response time history.

24. A Multi-Protocol Over ATM (MPOA) system comprising an ingress MPOA client in communication with an egress MPOA client by way of at least one MPOA seer within an ATM network, wherein the ingress MPOA client establishes a shortcut Virtual Channel Connection (VCC) to the egress MPOA client upon detecting a packet flow and determining that an expected MPOA server response time is within a predetermined MPOA server response time threshold, and wherein the ingress MPOA client updates the MPOA server response time information stored in the MPOA server response time history to reflect an actual MPOA server response time incurred when the ingress MPOA client establishes the shortcut VCC.

* * * * *

UNITED STATES PATENT AND TRADEMARK OFFICE
CERTIFICATE OF CORRECTION

PATENT NO. : 6,671,279 B1
DATED : December 30, 2003
INVENTOR(S) : Jim Mangin, Mohan Kalkunte and Derek Pitcher It is certified that error appears in the above-identified patent and that said Letters Patent is hereby corrected as shown below:

Column 15,
Line 44, delete "step" and insert -- steps --.

Column 16,
Line 14, delete "sever" and insert -- server --.

Column 18,
Line 34, delete "Server" and insert -- server --.
Line 48, delete "tie" and insert -- time --.
Line 59, delete "sever" and insert -- server --.

Signed and Sealed this

Twenty-fourth Day of May, 2005

JON W. DUDAS
*Director of the United States Patent and Trademark Office*